United States Patent [19]
Meyer

[11] 3,891,411
[45] June 24, 1975

[54] METHOD AND APPARATUS FOR THE PRODUCTION OF NITROGEN FOR USE AS AN INERT GAS

[75] Inventor: Georg Michael Meyer, Meerbusch Langst-Kierst, Germany

[73] Assignee: Deutsche Babcock & Wilcox Aktiengesellschaft, Oberhausen, Germany

[22] Filed: Dec. 11, 1973

[21] Appl. No.: 423,664

[30] Foreign Application Priority Data
Dec. 13, 1972 Germany.......................... 2260872

[52] U.S. Cl. .................. 55/26; 55/58; 55/62; 55/68; 55/75; 55/389
[51] Int. Cl.² ........................................ B01D 53/04
[58] Field of Search .................. 55/25–28, 59, 55/74, 75, 179, 196, 387, 389, 62, 68

[56] References Cited
UNITED STATES PATENTS

| | | | |
|---|---|---|---|
| 3,078,639 | 2/1963 | Milton | 55/75 X |
| 3,738,084 | 6/1973 | Simonet et al. | 55/75 X |
| 3,775,946 | 12/1973 | Brazzel | 55/74 X |
| 3,808,773 | 6/1974 | Reyhing et al. | 55/75 X |

*Primary Examiner*—John Adee
*Assistant Examiner*—Richard W. Burks
*Attorney, Agent, or Firm*—Frank J. Jordan

[57] ABSTRACT

An arrangement for the production of nitrogen to be used as an inert gas in which carbon dioxide and water vapor are separated from a gas mixture consisting essentially of nitrogen and carbon dioxide. Two tanks connected in parallel have molecular beds through which the gas mixture is passed alternatingly. When the gas mixture is passed through one tank for adsorption purposes, then the other tank is being desorbed by a gas stream leaving the first tank and consisting of nitrogen. The stream of gas through a tank during the desorption phase is opposite to the direction of the gas flow during the adsorption phase.

6 Claims, 1 Drawing Figure

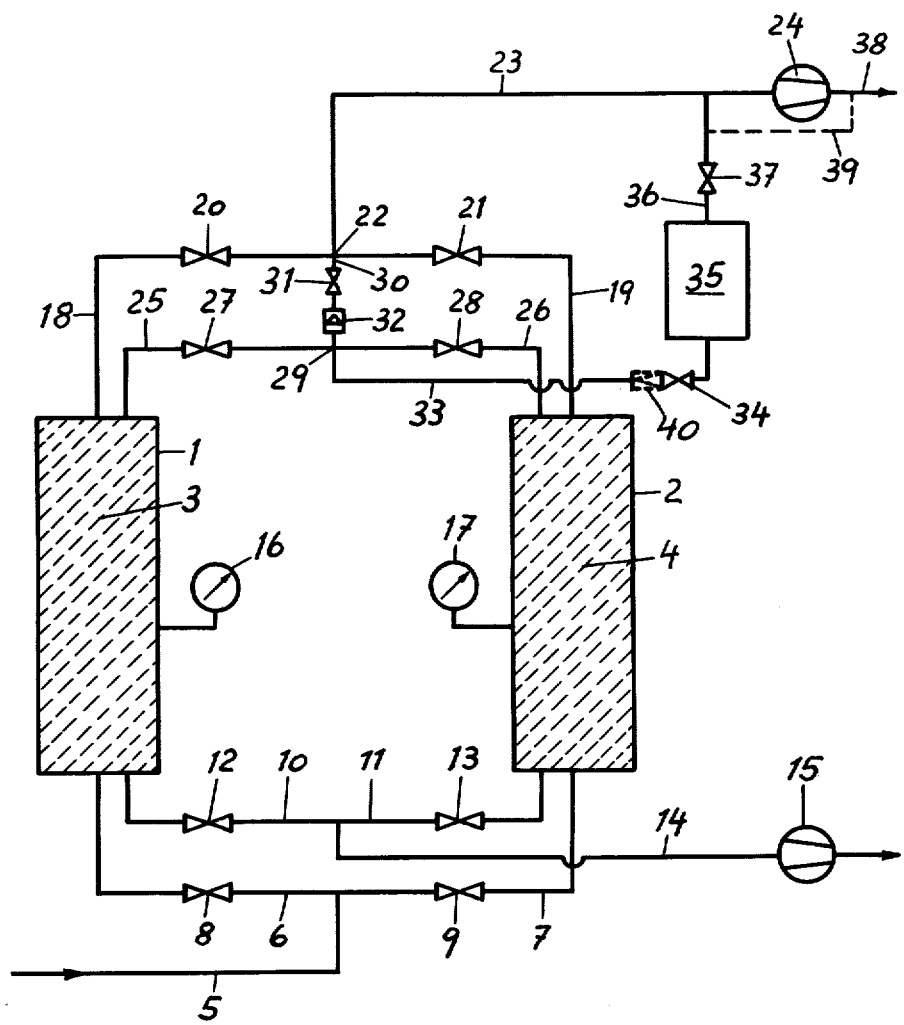

METHOD AND APPARATUS FOR THE PRODUCTION OF NITROGEN FOR USE AS AN INERT GAS

BACKGROUND OF THE INVENTION

The present invention relates to a method and apparatus for the production of nitrogen intended to be used as an inert gas wherein carbon dioxide is separated from a gas mixture consisting essentially of nitrogen and carbon dioxide.

In the transportation of combustible liquids or explosive gases aboard ships, large quantities of inert gas are necessary. The inert gas is introduced in the tanks, for example, during discharging, in order to prevent explosions. Furthermore, the storage tanks for natural gas or manufactured gas as, for example, cooking gas, are constructed with double walls, and the space between walls is filled with inert gas. Such gas or manufactured gas is in the liquid state under normal pressure and at a correspondingly low temperature. The use of nitrogen as an inert gas for such storage tanks is particularly advantageous from the viewpoint of the low temperatures of approximately 165°C. at which the natural gas, for example is transported aboard ships.

Since liquid nitrogen can usually be obtained at most ports only at substantially high prices, it is desirable to produce nitrogen for inert gas aboard ship, particularly when there is an arrangement available for producing inert gas from a mixture of nitrogen and carbon dioxide.

Accordingly, it is an object of the present invention to overcome the disadvantages of known prior art arrangements and to provide a method and apparatus for the production of nitrogen for use as an inert gas by separating carbon dioxide from a gas mixture comprised essentially of nitrogen and carbon dioxide.

Another object of the present invention is to provide a method and apparatus of the foregoing character in which the production of nitrogen is accomplished in a simple manner aboard ship.

The objects of the present invention are achieved by providing two parallel-connected tanks which have molecular filter beds for the adsorption of carbon dioxide. The gas mixture is alternatingly passed through these two tanks, and when the gas mixture is directed through one tank, the molecular filter bed in the other tank is desorbed. The desorption is achieved by a stream of gas containing a part of the nitrogen leaving the tank which is in the adsorption phase. The direction of gas flow through a tank during the adsorption phase is opposite to the direction of flow in the desorption phase. With such an arrangement it is possible to obtain the continuous production of nitrogen in the form of an inert gas. Since the desorption of the molecular filter beds is accomplished with a portion of the nitrogen produced, additional desorption means may be ommitted.

It is advantageous when the adsorption of the carbon dioxide takes place at a pressure which is slightly above atmospheric, for example, 0.5 kg/cm². Similarly, it is advantageous when the desorption takes place at a pressure somewhat below atmospheric as, for example, 50 Torr.

At these pressures, optimum operation is obtained with respect to the adsorption and desorption phases, as well as the gas consumption during the desorption phase. The pressure for the adsorption phase has also the advantage that it is substantially the pressure at which the gas mixture leaves a cooling washer connected in front. Blowers or compressors can, thereby, be connected after the nitrogen production arrangement. Blowers, are not necessary between the actual inert gas generator and the cooling washer, and between the cooling washer and nitrogen production arrangement. The omission of such blowers, in this manner, is advantageous from the viewpoint of their size and contamination effects.

A further advantage of the arrangement in accordance with the present invention is that immediately upon termination of the desorption phase in one of the two tanks, a pressure rise results to a level which corresponds to the pressure of the gas mixture passing through the tank in the adsorption phase. In this manner, the tank which is to assume the adsorption phase is immediately ready for operation at every interchange of tanks.

An advantageous arrangement for carrying out the method in accordance with the present invention, is to provide two tanks through which gas may be alternatingly passed, and which are provided with molecular filter beds for the purpose of treating the gas mixture. A valve is included in the supply line for the gas mixture, so that one side of the valve is for the gas mixture whereas the other side leads to a line communicating with the atmosphere. At the output of the arrangement, in accordance with the present invention, is a valve for allowing, on the one hand, direct exit of the nitrogen in the form of inert gas, and on the other hand, passing this nitrogen out by way of a regulationg valve. The construction of this arrangement is simple, does not require waiting time, and has a substantially long operating life. These advantages are essential for operation aboard large fuel tankers.

The novel features which are considered as characteristic for the invention as set forth in particular in the appended claims. The invention itself, however, both as to its construction and its method of operation, together with additional objects and advantages thereof, will be best understood for from the following description of specific embodiments when read in connection with the accompanying drawing.

SUMMARY OF THE INVENTION

A method for producing nitrogen to be used as an inert gas includes separating carbon dioxide and water vapor from a gas mixture comprised substantially of nitrogen and carbon dioxide by the adsorption of carbon dioxide in a molecular filter bed in a first one of two parallel-connected tanks, desorbing simultaneously a molecular filter bed in the second tank, admitting the part of the nitrogen leaving the first tank into the second tank for desorbing the filter bed in the second tank, and directing the gas flow alternatingly through the tanks so that the direction of flow in the tanks during desorption is opposite to the direction of flow during adsorption.

BRIEF DESCRIPTION OF THE DRAWING

The accompanying drawing is a schematic diagram showing the fluid flow of components and apparatus for the production of nitrogen for use as an inert gas in accordance with the present invention.

DESCRIPTION OF THE PREFERRED EMBODIMENTS

Referring to the drawing, two tanks 1 and 2 are provided with molecular filter beds 3 and 4, respectively. A gas mixture consisting substantially of nitrogen and carbon dioxide is supplied through a line 5 which is branched off of the two tanks 1 and 2 by means of branch lines 6 and 7 containing valves 8 and 9, respectively. At the inputs of the tanks 1 and 2, lines 10 and 11 are furthermore provided with series-connected valves 12 and 13, respectively. Connected to the junction of lines 10 and 11 is a common line 14 which leads to the atmosphere through a vacuum pump 15. For the purpose of controlling the pressure prevailing in tanks 1 and 2, pressure measuring and indicating instruments 16 and 17 are provided.

At the outputs of the tanks 1 and 2 are lines 18 and 19 provided with series-connected valves 20 and 21 respectively. Lines 18 and 19 are joined at the junction 22 from which an outlet line 23 leads to a compressor 24 for the nitrogen in the form of an inert gas. At the output sides of the tanks 1 and 2, furthermore, are lines 25 and 26 provided with series connected valves 27 and 28 respectively. These lines 25 and 26 are joined at the junction 29 which is joined with the junction 22 through the line 30 including a regulating valve 31 and a flow measuring instrument 32. In addition, the junction 29 is connected to a storage tank 35 through line 33 and valve 34. Connected also to the storage tank 35 is a line 36 with series-connected valve 37 leading to the line 23 for the outlet of the nitrogen.

In the operation of the arrangement in accordance with the present invention, the gas mixture is supplied by the line 5. This gas mixture is produced, for example, in a conventional inert gas generator, and is freed from dust and sulphur components by a conventional cooling washer. The gas leaving the cooling washer consists essentially of nitrogen (85 to 90 percent) and carbon dioxide (15 to 10 percent). The gas also contains water vapor corresponding to the temperature and pressure of the cooling washer. Other components such as oxygen, carbon monoxide or sulphur dioxide or hydrogen sulfide, are negligible in quantity. As a result, this gas mixture may be used directly as an inert gas. Since for the reasons mentioned above, a pure nitrogen is desired as an inert gas, it is necessary to remove the carbon dioxide and water components, and the removal of these components takes place through adsorption in the molecular filter beds of tanks 1 and 2 through which the gas is passed in an alternating manner.

If, for example, tank 1 is switched to the adsorption phase, then valves 8, 20 are open and valves 12, 27 are closed. In this phase, the gas mixture flows through the lines 5 and 6 and includes tank 1 where the adsorption of carbon dioxide occurs. The pure nitrogen gas leaves tank 1 by way of lines 18 and 23. At the same time, tank 2 is switched to the desorption state in which the valves 9, 21 are closed and the valves 28, 13 are open. As a result, a portion of the nitrogen gas produced in the tank 1 flows through the regulating valve 31, the flow measuring instrument 32 the line 26, tank 2 and line 11, 14, vacuum pump 15 and into the atmosphere. As a result of such flow, desorption of the molecular filter bed 4 takes place whereby carbon dioxide molecules adhering to the molecular filter material are carried to the atmosphere by the gas which is passed through the tank in a direction opposite to the direction of flow which takes place when that tank is in the adsorption phase.

To further control the pressure levels described above in relation to tanks 1 and 2, as well as to control the pressure of the gas through the tank 2 for desorption purposes, measuring instruments 16, 17 and 32 are provided so that these may measure and indicate the prevailing pressures.

After the bed in tank 1 is charged or loaded, and the bed 4 in tank 2 has been desorbed, the tanks are switched so that adsorption takes place in tank 2, and desorption takes place in tank 1. For this purpose, valves 8, 13, 20 and 28 are closed whereas valves 9, 12, 21 and 27 are open.

A storage tank 35 is provided for the purpose of making ready each tank subjected to partial vacuum for desorption purposes, so that this tank may be switched rapidly to the adsorption phase at which it operates under pressure slightly above atmospheric. The line 36 connected to the storage tank 35 is, at substantially the same pressure as the nitrogen outlet line 23 which passes from the tank operating in the adsorption phase at a pressure above atmospheric. The valve 34 in line 35 is closed during the phases in which the tanks perform adsorption or desorption. The valve 34 is first opened immediately prior to the switching of tanks, and this valve 34 is held open for a duration until the tank which performed desorption, arrives at a pressure level above atmospheric. The valve 34 is thereafter closed, and the switching of tanks takes place in the manner described above. The tank which is then to operate in the adsorption phase, is at the proper pressure for adsorbing the carbon dioxide from the gas mixture passing through the tank.

The material used for the molecular filter beds is preferrably made of synthetic zeolite which has substantially high mechanical strength. With such material, it is possible to operate for example, with the following phase times:

| | |
|---|---|
| Adsorption: | 8 minutes |
| Desorption: | 7 minutes |
| Pressure Equalization Time: | 1 minute |

The control or regulation of the valves is best achieved in an automatic manner from a central control unit. For purposes of clarity and simplicity, the control lines are not shown in the drawing.

Upon insertion of the compressor 24, a connecting line 39 may be applied to connect the output 38 of the compressor to the valve 37 leading to the storage tank 35. With this arrangement, furthermore, a pressure reducing valve 40 is inserted after the valve 34 in the line 33. With this arrangement the storage tank may be made substantially small, and may be filled at a pressure substantially that prevailing in the line 5.

While the invention has been described by means of specific examples and in specific embodiments, it is not intended to be limited thereto, for obvious modifications will occur to those skilled in the art without departing from the spirit and scope of the invention.

What is claimed is:

1. A method for producing nitrogen to be used as an inert gas comprising the steps of separating carbon dioxide and water vapor from a gas mixture comprised substantially of nitrogen and carbon dioxide by the adsorption of carbon dioxide in a molecular filter bed in a first one of two parallel-connected tanks, said adsorption being effected at a pressure substantially above atmospheric, desorbing simultaneously a molecular filter bed in the second tank, said desorption being effected at a pressure substantially below atmospheric, admitting a part of the nitrogen leaving said first tank into said second tank for desorbing the filter bed in said second tank, increasing the pressure of said second tank in which desorption is terminated to a pressure level prevailing in said first tank in which adsorption occurs, directing the gas flow to said second tank to effect adsorption in said second tank, directing a part of the nitrogen leaving said second tank into said first tank for desorbing the filter bed in said first tank, and directing the gas flow alternatingly through said tanks to provide for consecutive and alternate adsorption and desorption with the direction of flow in the tanks during desorption being opposite to the direction of flow during adsorption.

2. The method as defined in claim 1 wherein adsorption occurs at a pressure of approximately 0.5 kg/cm$^2$ and desorption occurs at a pressure of approximately 50 Torr.

3. Apparatus for producing nitrogen to be used as an inert gas comprising two parallel connected tanks, molecular filter bed means in each of said tanks, a gas supply line for supplying gas to be treated to said tanks at a pressure above atmospheric such that adsorption is effected in said tanks at a pressure above atmospheric, a nitrogen outlet line for conducting treated nitrogen from said tanks, a compressor in said nitrogen outlet line, a first pair of branch lines each connected between one tank and said supply line, a second pair of branch lines each connected between one tank and said nitrogen outlet line, a third pair of branch lines each connected to one tank, an interconnecting conduit means between said second and third pair of branch lines, a control device in said interconnecting means to control the flow of treated nitrogen gas from said second pair of branch lines to said third pair of lines to thereby provide passage of treated nitrogen gas selectively to one of said tanks to effect desorption, a vacuum pump, a fourth pair of branch lines each connected between one tank and said vacuum pump whereby said vacuum pump draws from said one selected tank to provide for desorption therein at a pressure below apmospheric, and valve means in said first, second, third, and fourth pairs of branch lines operable to direct the gas flow alternatingly through said tanks to provide for consecutive and alternate adsorption and desorption with the direction of flow in said tanks during adsorption being opposite the direction of flow during desorption.

4. Apparatus according to claim 3 including a conduit between said third pair of branch lines and said nitrogen outlet line, a storage tank means in mid conduit for temporary storing treated nitrogen, and a control valve in said conduit to admit treated nitrogen from said storage tank via said third pair of branch lines to said selected tank which has terminated desorption to bring the pressure of the latter substantially up to the pressure in the other of said two tanks.

5. Apparatus according to claim 4 including means for filling said storage tank with treated nitrogen gas from the output of said compressor, and pressure reducing means in said conduit between said storage tank and said third pair of branch lines.

6. Apparatus according to calim 3 including a flow measuring device in said interconnecting conduit means.

* * * * *